United States Patent [19]
Kaplan

[11] 3,812,394
[45] May 21, 1974

[54] IMAGE SCREEN WITH SINGLE, OPTICALLY CONTINUOUS FILTER

[75] Inventor: Sam H. Kaplan, Chicago, Ill.

[73] Assignee: Zenith Radio Corporation, Chicago, Ill.

[22] Filed: Oct. 6, 1971

[21] Appl. No.: 186,886

[52] U.S. Cl............................ 313/92 B, 313/92 PD
[51] Int. Cl......................... H01j 29/30, H01j 29/28
[58] Field of Search............. 313/92 B, 85 S, 92 PD

[56] References Cited
UNITED STATES PATENTS

| | | | |
|---|---|---|---|
| 3,243,625 | 3/1966 | Levine et al.................. | 313/92 PH |
| 3,114,065 | 12/1963 | Kaplan........................... | 313/92 B |
| 3,308,326 | 3/1967 | Kaplan........................... | 313/92 R |
| 3,354,341 | 11/1967 | Donahue et al................ | 313/92 B |
| 3,569,761 | 3/1971 | Lange............................ | 313/92 B |

Primary Examiner—Robert Segal

[57] ABSTRACT

The screen of a shadow-mask tri-color picture tube has a series of optically continuous red filters not only covering screen areas assigned to red but also extending into abutting relation with screen areas assigned to blue and green. These latter areas have deposits of the appropriate color phosphor but the blue phosphor is pigmented.

Another embodiment features a generally similar application of filter characteristics to the red and blue phosphor deposits of a black-surround tube further to improve brightness by enlarging the phosphor deposits and, at the same time, improving screen anti-reflectance.

8 Claims, 3 Drawing Figures

IMAGE SCREEN WITH SINGLE, OPTICALLY CONTINUOUS FILTER

CROSS REFERENCE TO RELATED APPLICATIONS

The preferred screen structure embodying the invention may be processed in accordance with methods described and claimed in the following copending applications: Ser. No. 66,455, filed in the name of Irwin Kachel and Ser. No. 66,457, filed in the name of Ronald C. Robinder, both having the filing date of Aug. 24, 1970.

BACKGROUND OF THE INVENTION

The present invention is addressed to a novel form of image screen for a shadow-mask type of tri-color tube having the advantage of attractive reflectance and brightness properties while subject to simplified manufacturing processes.

There has been a continuing development of tri-color picture tubes to improve their image reproducing characteristics. Particular emphasis has been placed on the contrast and brightness aspects of the screen. An early step in the continuing research led to the structure described and claimed in U.S. Pat. No. 3,114,065, issued Dec. 10, 1963 to Sam H. Kaplan. This patent discloses combining each of the three phosphor materials which make up the tri-color screen with a filter that is highly transmissive of the color or wavelength of light emitted by its associated phosphor material but is otherwise an attenuator throughout the visible spectrum. The filter may be interposed as a layer between the phosphor and the faceplate or may be admixed with the phosphor and applied concurrently to the elemental screen areas assigned to the particular color. This permits control of colorimetry and an attractively low value of reflectance which enhances contrast.

Another and most successful development step of the continuing program is the subject of U.S. Pat. No. 3,146,368, issued on Aug. 25, 1964 to Joseph P Fiore et al. A screen structure is disclosed in that patent which is now popularly referred to as a black-surround screen. It derives its name from the fact that the phosphor deposits, instead of having tangential contact with one another, are reduced in size to be mutually separated from one another over the screen area and a light-absorbing pigment is placed in the spaces between or around these phosphor deposits. The electron beams of the tube are larger in cross sectional area than the phosphor dots and this screen structure has optimum contrast and brightness. It has, for example, permitted the brightness of mass produced tri-color picture tubes to be doubled.

The manufacture of the black-surround tube, however, has presented difficulties due to the preferred dimensioning of phosphor dots smaller than the electron beams. The most successful manufacturing process has involved a technique referred to as "etch back" in which the shadow mask is originally prepared with apertures dimensioned so that when used as a pattern in the photographic printing of the screen the phosphors have a desired size. After screening has been accomplished, the mask is etched for the second time in order to enlarge its apertures, permitting the electron beams to be larger by a desired amount than the phosphor dots.

A still further development of the program is described and claimed in U.S. Pat. No. 3,569,761, issued Mar. 9, 1971 to Howard G. Lange. This patent discloses what is functionally much the same as the black-surround screen although structurally it is quite different. In particular, it extends the teaching of Kaplan U.S. Pat. No. 3,114,065 to provide a black-surround type of screen without the requirement of etch back. It utilizes at each elemental area of the screen assigned to a particular color both a filter and a phosphor deposit. The phosphor emits light of the color appropriate to that section of the screen and the filter is colorimetrically related to be highly transmissive of that color of light but otherwise to serve as an attenuator for visible light. Additionally, the filter elements extend over or bridge the spaces between the elemental areas of the screen assigned to the various colors and, consequently, these spaces receive at least two overlapping filter elements. Because of the characteristics of the various filters, the spaces intervening the elemental areas of the screen assigned to the various colors are provided with light attenuators and serve essentially the same function as the black-surround or light-absorbing material of the above-described Fiore et al. structure.

The arrangement of the Lange patent is attractive because of the control it affords with respect to colorimetry and further because it may be processed without certain of the steps required in the re-etch approach. The Lange screen accomplishes its result at some sacrifice of screen brightness due to the fact that the optical filter art is far short from producing ideal filters at the appropriate light wavelengths. However, the filter components cause the colors of a reproduced image to hold fast and resist washout even in environments of high ambient lighting conditions similar to screen structures described in U.S. Pat. No. 3,114,065 but with improved contrast.

It is an object of the invention to further the development program and provide other novel image screen structures for a shadow-mask type of tri-color picture tube.

It is a specific object of the invention to provide such a screen with attractive attributes of brightness and reflectance but which lends itself to simplified processing.

SUMMARY OF THE INVENTION

An image screen for a shadow-mask type of tri-color picture tube, constructed in accordance with the invention, comprises a faceplate that has three mutually spaced but interleaved sets of elemental areas each of which is to receive an assigned one of the three customary phosphor materials, red, green and blue. The screen in one embodiment has but a single series of optically continuous filter elements which are disposed over one of the aforementioned three sets of elemental screen areas and are dimensioned to extend into substantially abutting relation with the remaining two sets of elemental screen areas. The filter elements are transmissive to light of the color assigned to the set of elemental areas to which the filters are applied but otherwise the filters constitute an attenuator for light in the visible spectrum. A phosphor material which generates light to which the filter is transmissive is deposited over at least those portions of the filter that cover the elemental screen areas assigned to that particular color.

There are further deposits of the other two color phosphors in the respective ones of the remaining two sets of elemental screen areas and at least one of these two other phosphor materials has a pigmentation constituting an optically discontinuous filter that is transmissive to the light of the color emitted by its associated phosphor.

In a preferred embodiment, the screen structure has optically continuous red filter elements over which red phosphor is deposited and the blue phosphor is pigmented with ultramarine pigment.

The invention also has application to a black-surround tube and in that environment the filter feature is again, by preference, associated with the red and blue phosphors. An optically continuous filter may underlie the red phosphor or optically discontinuous filters may be provided for both the red and blue phosphors.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENT

Shadow-mask types of color picture tubes are now well known both as to structure and mode of operation. They are subject to various screen sizes and configurations as well as phosphor patterns. By way of illustration, the screen may be round or rectangular and the phosphor deposits may be strips or the more familiar phosphor dots. These details of the tube are of no consequence to the present invention but, for convenience, it will be assumed that the screen to be described has a rectangular image field with interleaved sets of phosphor dots collectively constituting a mosaic or a family of phosphor dot triads individually comprised of a dot of red, a dot of green and a dot of blue phosphor. By the same token, the details of the shadow mask are of no particular moment to the subject invention and therefore will be assumed to have a similar rectangular field of apertures with each aperture aligned with an assigned triad of the screen so that electron beams developed in a cluster of three electron guns may reach the screen through the apertures of the mask at such angles of approach that each beam impinges upon and excites only the color phosphor to which the beam is assigned. An equivalent result may be attained by using a single-beam tube with a switching arrangement to achieve tri-color image fields. Since all such matters are well understood in the art, the remainder of this disclosure will concern itself more particularly with the details of the novel screen structure.

Figure 1:
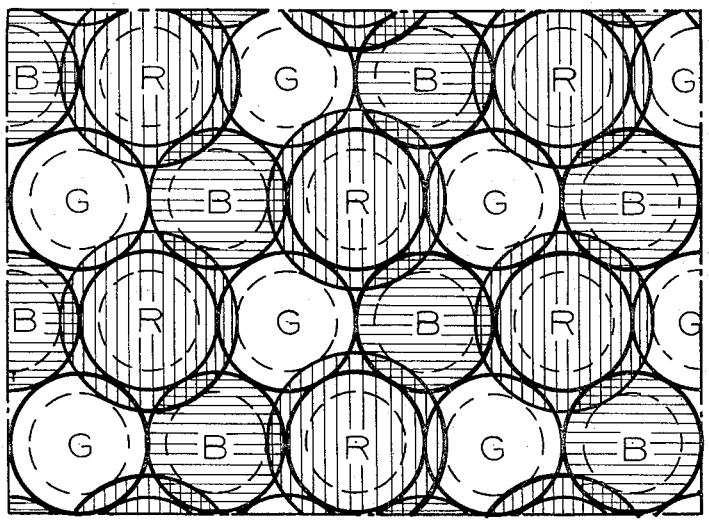
FIG. 1 is an enlarged showing of a fragmentary portion of a tri-color screen in accordance with one embodiment of the invention.

FIG. 1 represents a fragmentary portion of the faceplate 10 of a shadow-mask color tube which serves as the image screen. Since the screen is a mosaic, comprised of a multiplicity of phosphor dot triads, the faceplate may be thought of as having three mutually spaced but interleaved sets of elemental areas each of which is to receive an assigned one of the customary three phosphor materials, namely, red, green and blue. The locations of these elemental areas are indicated in FIG. 1 by the circles which enclose the legends R, G and B. The illustration also makes clear the pattern of interlace by which the three sets of elemental areas collectively define the assigned triad locations. In a conventional shadow-mask tube which does not have the advantages of a black-surround screen of the type disclosed in U.S. Pat. No. 3,146,368 — Fiore et al. or the simulated black-surround screen disclosed in U.S. Pat. No. 3,569,761 — Lange, the full-line circles of FIG. 1 which are in tangential contact with one another represent the sets of elemental screen areas to receive deposits of phosphor. The concern here is simply with the size of the phosphor dots rather than their distribution pattern which still defines the desired dot triads. There is, of course, an aperture mask in spaced parallel relation to the faceplate when the tube is completed with one aperture thereof in alignment with one triad of the screen. This, however, is thoroughly well known and therefore the mask has been omitted from FIG. 1 in order to simplify an understanding of the screen structure to which the invention is more particularly addressed.

The screen under consideration has but a single series of optically continuous filter elements disposed over one of the three sets of elemental screen areas and extending into substantially abutting relation with the remaining two sets of elemental screen areas. These filter elements are transmissive to light of the color assigned to the particular set of elemental screen areas covered by the filters but otherwise the filter elements serve as an attenuator for light in the visible spectrum, especially to light of the colors assigned to the remaining two sets of elemental screen areas. More particularly and for a preferred form of screen structure, the filter elements have a high transmission efficiency for red light and are disposed over the elemental image areas assigned to red. These filter elements are shown in FIG. 1 to be circular and concentrically positioned relative to those elemental screen areas R that are assigned to the color red. The filter elements are represented by the large full-line circles and are dimensioned to extend beyond the elemental screen areas R into abutting relation with the neighboring elemental screen areas B and G assigned to the colors blue and green, respectively. This size relation is represented by the tangent contact of the large circle R with the broken-line circles B and G. In order that the elemental screen areas R may generate a controlled amount of red light, they receive deposits of red phosphor material which deposit, in the representation of FIG. 1, is indicated by the intermediate circle at each location R. This of course signifies one screening possibility, namely, that in which in the red phosphor is confined to the elemental screen areas assigned to red rather than covering the entirety of the red filter components which is another possibility. Further consideration will be given to the latter hereinafter.

The other sets B and G of elemental screen areas also receive deposits of phosphor material and such deposits are represented by the area enclosed within the full-line circles associated with the screen elements B and G. At least one of the blue and green phosphors has a pigmentation which constitutes an optically discontinuous filter that is transmissive to the light of the color emitted by the phosphor material with which it is associated. Again, in a preferred embodiment of the invention, the elemental screen areas B receive a deposit of pigmented blue phosphor and the areas G receive a deposit of green phosphor without separate pigmentation. It is advantageous, however, that the green phosphor be silver activated, such as silver activated zinc cadmium sulphide because even conventional silver activated green phosphors usually oxidize on bakeout and in oxidizing develop a yellowish green or a coloration in situ. This effect may be enhanced by the inclusion of certain additives to the phosphor material or to the slurry by means of which the phosphor is applied, such as citric acid. Where this coloration is experienced, it provides a filtering action appropriate to the green phosphor.

If the screen structure of FIG. 1 be considered to be comprised only of the components indicated by the family of full-line circles that are in tangential contact with one another and if it be assumed, as described, that these circles define the deposits of the red, blue and green phosphors, the screen will be recognized as conventional except for the filtering elements. That is to say, if one ignores the filters for the moment, the screen is one of circular phosphor dots in tangential contact with one another and the broken-line circles indicate the outline of the electron beams associated with the three sets of elemental screen areas for exciting the three colors in accordance with the chroma information of an image being reproduced. It will be observed that the electron beams are smaller in size or cross sectional area than the phosphor deposits. This size relation usually results if the phosphor dots are photoprinted employing the shadow mask as a printing pattern having holes or apertures of the same size as that used in the finished form of the tube. The area between the broken-line circle and the full-line circle of each elemental screen area constitutes a guard band permitting some degree of misregistration of a beam with its phosphor dot without suffering a loss of purity. Where the beams are smaller than the phosphor deposit as indicated and described, this is a condition referred to in the art as a positive tolerance. The broken-line circle adopted to indicate an electron beam has been applied to all elemental screen areas of the fragmentary structure of FIG. 1. Of course, it will be understood that these electron beams pass through a single aperture of the shadow mask and therefore excite the elements of a single phosphor triad at any operating instant.

The vertical crosshatching over elemental screen areas R shows that the optically continuous filter elements cover to a significant extent the tolerance or guard bands of the blue and green elemental screen areas and, in effect, serve as a light attenuator in all such portions of the blue and green sets of elemental screen areas. Additionally, these optically continuous filters R cover a very substantial percentage of the faceplate area and contribute to the overall faceplate a low reflectance because these elements are efficient in transmitting essentially only red light.

The horizontal crosshatch lines in the elemental screen areas B are, in effect, optically discontinuous filters contributed by the pigmentation of the blue phosphor. In conjunction with the filter elements R, they add to the desired low reflectance property of the screen and since these two sets of filters collectively cover the major portion of the faceplate area, the reflectance may be even lower than that realized with a black-surround screen structure of the type shown in U.S. Pat. No. 3,146,368. A further advantage of the pigmented blue filter is in the colorimetry of the de-energized screen. If the red filters were used alone, there would tend to be a red cast to the de-energized screen but this is rendered a generally neutral color by the presence of the pigmentation of the blue phosphor. It is a much more acceptable de-energized screen appearance than attainable with the red filters alone. Observe that there are areas in which the red filters (vertical crosshatching) and the blue filters (horizontal crosshatching) overlap. In all such areas there is a more complete filtering action with respect to visible light. Some of this same effect may be experienced in the overlap areas of the red filters and the green phosphor deposits especially where the green phosphor receives a coloring in situ as explained above.

No claim of novelty is made with respect to the processing steps in constructing the screen of FIG. 1. The various components may be formed by processes known to the prior art or described in detail in the above-identified copending applications, especially that of the application of Kachel.

Both the Robinder and Kachel applications concern the preparation of filter elements for a cathode-ray tube screen formed of luster materials. A metallic luster is a metal resonate which is the reaction product of a metal compound or oxide as a base neutralized with, for example, an organic resinic acid. Such a luster has the property that upon being heated to a predetermined firing temperature the organic ingredient volatilizes and develops, as a residue, an inorganic colorant. In other words, the luster may be described as an inorganic oxide colorant in a vehicle of organic character that disappears on firing. Lusters of various colors are manufactured and sold commercially as organic solutions although most often the specifics of their compositions are retained as trade secrets. Nevertheless, they may be treated, as described in the Kachel application, to be utilized as an ingredient of a water-based photosensitive slurry system similar in all material processing respects to the water-based compositions currently used in photographic printing of the phosphor dots of a color television picture screen.

More specifically a commercial luster, chosen for the color desired, is heated to boil off its solvent. For example, 35 cc of any type luster solution is heated to about 150° C. for an interval of 5 to 10 minutes. This temperature is much less than the firing temperature of the luster which may be about 450° C., and evaporates the solvent leaving a viscous liquid containing metallic resonate and remnants of the solvent and resins such as oil of lavender and gum damar of the original luster solution. To this thick liquid, and while it remains hot, is added a quantity (4 grams) of a polymeric compound, such as polyvinyl pyrrolidone (pvp), which is soluble in water and has a liquifying temperature such that it dissolves in the hot thick liquid. This mixture is cooled and is then dissolved in 100 cc of methyl alcohol which, in turn, is soluble in water. Thereafter, 200 cc of water is added and then 200 cc of 5 per cent polyvinyl alcohol (pva). Finally, the material is sensitized by mixing in 7 cc of 10 per cent ammonium dichromate. This completes the preparation of a coating material which is an emulsion having water in continuous phase and a dispersion of water bearing the metallic resonates. It is photosensitive and may be utilized in photographically printing the optically continuous filter elements of the screen.

In accordance with another method, to 50 cc of a commercial luster is added 8 cc of "Alipal," a nonionic wetting agent distributed by GAF Corporation of New York, N.Y. These are mixed with an ultrasonic agitator and then 150 cc of water is added. To this is further added a mixture of 150 cc of 10 per cent polyvinyl alcohol (pva), 225 cc of water and 7 cc of 10 per cent ammonium dichromate. This also gives a water based emulsion suitable for photograhpic printing.

For the preferred form of screen, a red luster, such as Englehardt Industries, Inc. A-2000 of East Newark, New Jersey, is prepared in either of the manners described and the resulting coating material is applied in any convenient way as a layer over faceplate 10, assuming the faceplate to have been made chemically clean. After covering the screen with a layer of this coating material, it is dried by forced or by infrared lamps in the same manner as a phosphor slurry or pva slurry for making a black surround tube. Having dried the layer, preselected portions of it are exposed to actinic energy to establish a latent image of the distribution pattern desired for the colorant or filter. This step is generally similar to known photoprinting techniques employed in screening color tubes. It entails exposing the coated faceplate 10 with ultraviolet light directed to the faceplate through the shadow mask (not shown) which shall have been installed in its proper position relative to faceplate 10 and with the exposing light source positioned to simulate the electron beam of the tube in process assigned to excite the red color phosphor. As a result of this exposure, portions of the luster emulsion layer are rendered insoluble in water and constitute a latent image of the distribution pattern of the red filter elements. The next process step comprises developing that image which simply requires rinsing or washing the screen with water to remove the unexposed portions of the coating layer. Thereafter the screen is dried and heated to the firing temperature which is that temperature at which the organic ingredient of a metallic luster volatilizes and deposits the red colorant as an optically continuous filter on the elemental screen areas R of the faceplate.

Dimensioning of the red filter elements may be accomplished by controlling the intensity of the light source and the duration of the exposure interval. Since each filter is formed by exposing through an aperture of the mask, the filter has the same configuration as the mask aperture and may be made larger than the mask aperture by adjustment of the exposure parameters as well understood in the art. It is desired that the filter diameter correspond with the largest full-line circle centered on each elemental screen area R as illustrated in FIG. 1 and as described above. Having deposited the series of red filter elements, the phosphors may be deposited on the screen in strictly conventional fashion. As explained above, the phosphor deposits may be essentially the same, as to fabrication and size, as those of a conventional shadow mask tube in which the phosphor dots are dimensioned to be in tangential contact with one another. The order of applying the phosphors favors applying the blue pigmented slurry first to eliminate the possibility of blue pigment pickup in the red and green phosphor areas. The developed red filters is the first step in the screening process. Next apply the blue, green and red phosphors. Of these, the blue and green phosphor materials are disposed immediately above the portions of the red filter elements that fall in the guard bands of the blue and green phosphor dots. Again, dimensioning of the phosphor dots is subject to control by adjustment of the parameters in the exposure step. It is not difficult to have the phosphor deposits smaller in area than the red filter elements and also in substantially tangential contact with one another.

If desired, the deposits of blue and green phosphors may be restricted so as not to cover any portion of the red filters. In any such case, however, it will be preferred to confine the red phosphor deposits so that they do not impinge upon the guard bands for blue and green.

Where such a screen structure is to be made, the exposure for blue phosphor, assuming it to be applied before green, employs forward exposure of the blue slurry through the shadow mask in conjunction with a flooding backward exposure. By adjusting the intensities of the exposure sources and the length of the exposure time, all portions of the blue slurry receiving both forward and backward exposures, except for the blue slurry overlying the red filters, will become insolubilized and may, therefore, be developed. The same result may then be achieved for green in the same fashion or simply by use of a backward flooding beam of suitable intensity applied for a sufficient interval of time. In the latter case, it may be necessary, however, to treat the blue phosphor dots with a dye to make certain that they are not transparent to ultraviolet light.

The screen of FIG. 1 is the preferred structure in light of the present state of the art, especially the luster art, because the most efficient commercially available lusters are those having red colorants. A desired relation of contrast to screen brightness may be achieved through control of the depth of concentration of the red luster. For example at a desired red optical density reflectivity may be reduced to less than half (47.5%) with only a drop of 16 per cent in red brightness. Additionally, the use of the red luster controls the red field colorimetrically with the advantage that red phosphors which may be more efficient light generators, although poor candidates for utilization in a normal tri-color screen because of unattractive colorimetric properties, become useful since the filters may correct the phosphor as to colorimetry.

For example an yttrium oxysulphide phosphor of 5 per cent Europium activator may be used instead of one having 6.5 per cent Europium. This phosphor of lower Europium content is 15 per cent brighter and of lower cost than the other phosphor.

The blue phosphor, by preference, has an ultramarine pigment which is a well understood trade designation for a complex sulpho-alumino silicate. It is beneficial because it has a low refractive index which increases contrast and is highly transmissive of blue light and thus preserves the blue light output. The pigment may of course be a coating of the blue phosphor particles or alternatively the phosphor may be an admixture of phosphor particles and blue pigment as described in the above-identified Kaplan patent. Alternatively a cobalt aluminiate pigment may be used. A three per cent ultramarine pigmentation has rendered acceptable screens in experiments conducted to date. Moreover, it has been found that a pigmented blue phosphor slurries more efficiently than a conventional or nonpigmented blue phosphor.

Screens made with a red filter formed of a red luster and with pigmented blue phosphors may be produced with shadow masks having conventional grades (illustratively 3 to 5 mils) and with aperture sizes of conventional value (illustratively 14 mils or even enlarged apertures especially at the center of the screen. Brightnesses as high as 65 foot Lamberts with reflectances in the neighborhood of 30 have been achieved although optimization of the screen components may well be expected to achieve brightnesses of 80 foot Lamberts or more. Indeed, performance approaching that of the best black-surround screen may be realized with the described screen structure with economies of screen manufacture. By way of illustration the described screen may be prepared utilizing a mask of conventional design except for larger apertures since it is not necessary to practice etch back or to otherwise modify the mask after having used it in screening. In fact, the described screen structure is very similar to conventional tri-color screens except for its filter components as to which the red filter represents additional processing steps but these steps are of the same type to which the art has be ome accustomed in photographic printing of color tube screens. The optically discontinuous blue filter component is introduced simply by a modification of the blue phosphor slurry and without the addition of further processing steps. As stated above, the red phosphor may cover the entirety of the red filters but since these filters project into the guard bands of the blue and green it is preferred that the phosphor dots of all three colors be about the same size.

The embodiment of FIG. 1 has been described with a condition of positive tolerance, that is to say, with electron beams of smaller cross sectional area than the phosphor dots. This is not a limitation of the described structure; negative tolerances may also be employed if desired. A negative tolerance is one in which the electron beams are larger in cross sectional area than the phosphor dots and their relative size is chosen to achieve the same tolerance or guard band for purity reserve. The negative tolerance condition may be produced in a variety of fashions. One that suggests itself directly is having the apertures of the mask of small dimension when used in screening but of larger dimension when finally installed in the tube. This is a known technique that may be achieved either by etch back as described above or by temporarily closing down the mask holes for the purpose of screening with a material that is thereafter removable when the screening has been accomplished. A still further approach is the subject of copending applications of Sam H. Kaplan, Ser. No. 773,833, filed Nov. 6, 1968 and Ser. No. 179,921, filed Sept. 13, 1971, wherein the exposure to determine the green phosphor deposit is made from the red and blue exposure positions. In general, the deposit of any one phosphor is determined by exposures from the remaining two color positions so that the deposit is controllably smaller than the apertures of the shadow mask.

Figure 2:
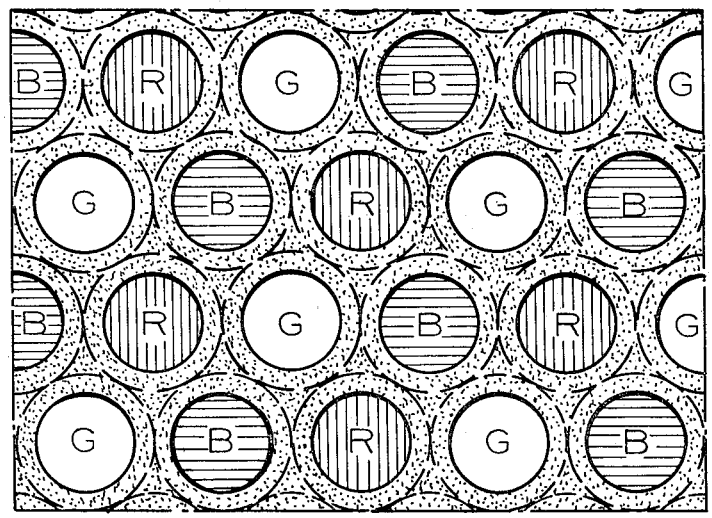
FIGS. 2 and 3 are similar showings of other embodiments.
Figure 3:
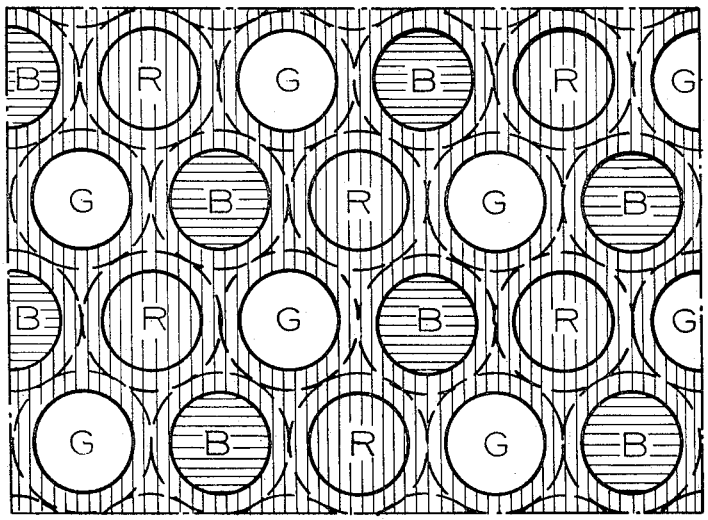

As stated above negative tolerance may be adapted in screens of the type under consideration and one such structure is illustrated in FIG. 2. In this screen the filter concept of the present invention is applied to a black-surround tube wherein the black surround or light-absorbing material is designated by mottling while vertical crosshatching again represents a filter component applied to the set of red elemental image areas of the tube and horizontal crosshatching represents a filter component applied to the sets of blue elemental image areas.

The processing techniques for screening this type of structure are also well known in the art. For example, U.S. Pat. No. 3,558,310 — Mayaud describes a method for applying graphite or other light-absorbing material. Preliminarily, deposits of clear pva are applied to every elemental area of the screen that is to receive phosphor whether or not it additionally receives a filter component. This is done by conventional photoresist printing utilizing the shadow mask as a pattern to expose selected portions of a layer of clear pva, sensitized by ammonium dichromate. Three exposures are required, one with the light source simulating each of the three electron beams, in turn. After exposure, the faceplate is washed with water leaving dots of clear pva protecting all of the elemental image areas of the screen. Preferably, the exposures are accomplished so that the pva dots are smaller in area than the area of the mask apertures as the mask is finally installed in the tube.

Next, the screen is covered with graphite and then the pva dots are removed by washing the screen with a chemical stripper, such as hydrogen peroxide. At this juncture, the screen has a graphite covering with holes for receiving the three phosphor materials. The screening from this point forward may be generally the same as that described in connection with FIG. 1 except that due to the presence of the graphite all filter and phosphor materials are confined, so far as the faceplate itself is concerned, to the areas of the holes previously formed in the graphite layer. Actually, any of these materials may overlap on the contiguous portions of the graphite layer without adverse effect.

Preferably, the red luster, optically continuous filters are applied first over the elemental screen areas assigned to red. Thereafter, the phosphors are deposited with the blue phosphor being pigmented. Alternatively, both the red and blue phosphors may be pigmented which is a simplification in that the red filters may be applied along with the red phosphor, as a coating or admixture, obviating a separate filter forming step.

A very particular advantage flowing from the arrangement of FIG. 2 is that it permits further increasing brightness in a black-surround tube while retaining and even improving its reflectances, whereas improvement in brightness would expect to be at a substantial sacrifice in reflectance. For example, in order to increase brightness in a black-surround tube, all other things being the same, it is necessary to increase the mask apertures so that the phosphor dots could have increased size while at the same time retaining the negative-tolerance condition of beams larger in area than the phosphor dots to have full illumination of the dots. Increasing phosphor dot size, however, necessarily decreases the spacing between dots and the total screen area available for the graphite or other lightabsorbing pigment. The decrease in amount of light-absorbing material adversely affects screen reflectance but the utilization of red and blue filter components in accordance with the invention not only preserves but may also further enhance anti-reflectance. This is a highly desirable result that is realized at an immaterial loss of screen brightness.

In one specific embodiment of the arrangement of FIG. 2, the mask apertures were 15 mils in diameter on 17 mil centers. Comparative measurements were made of screen structures processed in the same fashion except that one set of screens employed filtering while the other did not. The results with respect to brightness, reflectivity and color coordinates are recorded in the following table:

|  | Brightness | Reflectivity | Color X | Y |
|---|---|---|---|---|
| RED[1] |  |  |  |  |
| without luster | 100% | 100% | 642 | 350 |
| with luster | 84% | 52.5% | 656 | 338 |
| BLUE[2] |  |  |  |  |
| without pigment | 100% | 100% |  |  |
| with pigment | 84% | 61% |  |  |

Note 1 — the luster was A-2000 and the phosphor was U.S. Radium oxysulphite No. 555.
Note 2 — control tests were conducted at 0, 2, 4, 6 and 8% pigmented blue and the data of the table was obtained by interpolation to a pigmentation of 3% accepted as standard.

Because of the improvement in color resulting from the red filter, it is expected that higher brightness, more orange oxysulphide red phosphor (less Europium) e.g. U.S. Radium No. 550, may be used. Moreover, image reproduction in high light ambients should be superior because the filter-phosphor combination resists washout.

In still another approach the red filter formed of a luster material is applied over the entire area of the screen except for the set of elemental screen areas intended to receive blue phosphor deposits and the remaining set of elemental screen areas designated to receive green phosphor deposits. Again, the process for developing such a layer may be that described in U.S. Pat. No. 3,558,310 — Mayaud. In this situation, however, only two sets of clear pva dots are formed on the faceplate, one set covering the elemental screen areas assigned to blue and the other covering elemental screen areas assigned to green. Having protected these portions of the screen, the red filter is otherwise developed over the remainder of the faceplate and thereafter the clear pva deposits are removed by a chemical stripper to give access to the elemental screen areas that are to receive the blue and green phosphor deposits. From that point forward, screening is essentially conventional except for the use of pigmented blue phosphor in order to achieve a combination of the optically continuous red filters and the optically discontinuous blue filters.

In the embodiments considered above a first bakeout step is undertaken to deposit the optically continuous filter and thereafter the phosphors are deposited followed by a second bakeout which may be eliminated by baking the screen during the panel-funnel frit cycle. In any screening process in which the pattern of optically continuous filters is comprised of an insolubilized pattern within a photosensitive coating layer having a luster as an ingredient it would appear, at least in principle, that a single bakeout is sufficient. It may in theory be possible to eliminate this separate luster bake by formula modifications.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An image screen for a shadow-mask type of tricolor picture tube comprising:
 a faceplate having three mutually spaced but interleaved sets of elemental areas each of which is to receive an assigned one of three phosphor materials, red, green and blue;
 only one series of optically continuous filter elements, said filter elements being disposed over one of said sets of elemental areas and extending into substantially abutting relation with the remaining two sets of elemental areas and said filter elements being transmissive to light of the color assigned to said one set of elemental areas but being an attenuator for light of the colors assigned to said remaining two sets of elemental areas;
 deposits of phosphor material of the color assigned to said one set of elemental areas over at least the portions of said filter elements that cover said one set of elemental areas;
 and deposits of the remaining two color phosphor materials on the respective ones of said remaining two sets of elemental areas, at least one of said two remaining color phosphor materials having a pigmentation constituting an optically discontinuous filter that is transmissive to light of the color emitted by such phosphor material.

2. An image screen in accordance with claim 1 in which said optically continuous filter is predominantly transmissive of light of the color red.

3. An image screen in accordance with claim 2 in which only said blue phosphor is pigmented and it has an ultramarine pigment.

4. An image screen in accordance with claim 3 in which said green phosphor is silver-activated zinc cadmium sulphide.

5. An image screen in accordance with claim 2 in which said red filters are comprised of a layer of red filter material covering all of said faceplate except for said two remaining sets of elemental areas thereof.

6. An image screen in accordance with claim 3 in which said pigmented blue phosphor not only covers the one set of elemental areas assigned to blue but also overlaps said red filters in the spaces separating the screen areas assigned to blue and those assigned to red.

7. An image screen in accordance with claim 6 in which said red phosphor covers substantially only the portions of said red filters that overlie elemental screen areas assigned to red.

8. An image screen for a shadow-mask type of tricolor picture tube, comprising:
 a faceplate having three mutually spaced, interleaved sets of elemental areas each of which is to receive an assigned one of three phosphor materials, red, green and blue;
 only one series of optically continuous filter elements, said filter elements being selectively transmissive of red light to the substantial exclusion of blue and green light and being disposed over the one of said sets of elemental areas assigned to receive red phosphor material but larger than said elemental areas so as to partially overlap the remaining two sets of elemental areas assigned to blue and green phosphor materials;

deposits of red phosphor material over at least the portions of the red filter elements that cover said one set of elemental areas;

deposits of blue phosphor material on one of said remaining two sets of elemental areas in overlapping relationship with said red filter elements, said blue phosphor material having a blue pigmentation comprising an optically discontinuous filter that is selectively transmissive to blue light to the substantial exclusion of red and green light; and deposits of green phosphor material on the remaining set of elemental areas in overlapping relationship with said red filter elements, whereby white ambient light impinging upon said screen is substantially completely absorbed in the areas of overlap between said red filter elements and said blue phosphor materials and is absorbed in a major part by said pigmented blue phosphor materials and by said red filter elements.

* * * * *